United States Patent [19]

Peters

[11] Patent Number: 4,973,650
[45] Date of Patent: Nov. 27, 1990

[54] POLYARYLSULFONE DERIVED FROM 1,4''-(BISHALOPHENYLSULFONE)TERPHENYL

[75] Inventor: Edward N. Peters, Lenox, Mass.

[73] Assignee: General Electric Company, Pittsfield, Mass.

[21] Appl. No.: 364,340

[22] Filed: Jun. 9, 1989

[51] Int. Cl.$^5$ ............................................. C08G 75/20
[52] U.S. Cl. ..................................... 528/174; 528/171
[58] Field of Search ............................... 528/174, 171

[56] References Cited

U.S. PATENT DOCUMENTS

| 4,175,175 | 11/1979 | Johnson et al. | 528/125 |
| 4,785,072 | 11/1988 | Harris et al. | 528/174 |

FOREIGN PATENT DOCUMENTS

| 50-47954 | 4/1975 | Japan. |
| 1234589 | 6/1971 | United Kingdom. |
| 1396990 | 6/1975 | United Kingdom. |
| 1397260 | 6/1975 | United Kingdom. |

OTHER PUBLICATIONS

Johnson et al. "Poly(aryl Ethers) by Nucleophilic Aromatic Substitution-I. Synthesis and Properties", Journal of Polymer Science-Part A-1, vol. 5, pp. 2375-2398 (1967).

Vogel, H. A., "Polyarylsulfones, Synthesis and Properties," Journal of Polymer Science, Part A-1, vol. 6, pp. 2035-2047, (1970).

Rose, J. B. "Preparation and Properties of Polyarylene Ether Sulfones)" Imperial Chemical Industries Ltd., Plastics Division, Welwyn Garden City, (Richard 2, Nov. 1973).

Primary Examiner—Harold D. Anderson
Attorney, Agent, or Firm—Spencer D. Conard

[57] ABSTRACT 1,4''-(bishalophenylsulfone)terphenyl and polymers therefrom are provided. The polymers exhibit high heat distortion temperatures, and high levels of chemical resistance and thermo-oxidative stability. The polymers are useful as molding compositions for making molded articles.

12 Claims, No Drawings

POLYARYLSULFONE DERIVED FROM 1,4″-(BISHALOPHENYLSULFONE)TERPHENYL

BACKGROUND OF THE INVENTION

1. Field of the Invention

This invention relates to melt crystallizable polyarylsulfones derived from 1,4″-bishalophenylsulfone)terphenyl.

2. Description of Related Art

Various poly(aryl ether sulfones) are known in the art, see e.g. POLYMER, 1974, Vol 15, July, pages 456–465. Typical poly(aryl ether sulfones) are amorphous materials and although a few can be induced to crystallize by solvent treatment, few, if any, have heretofore been found which will crystallize from the melt. Consequently, the softening behavior of these polymers is determined by their glass transition temperatures as is the case with primarily amorphous materials. The softening behavior of crystalline polymers, in contrast, especially if reinforced, is dependent on the melt temperature of the polymer rather than upon the glass transition temperature thereof. Thus, crystalline polymers, as a general rule, offer acceptable levels of performance at much higher temperatures than do amorphous polymers having somewhat similar polymeric structures. While crystallinity may be induced in a few known poly(aryl ether sulfones) by the employ of solvents, such solvent induced crystallization has a number of problems associated with it, including additional processing, significant reductions in important mechanical properties, and added material cost.

Accordingly, one object of the present invention is to provide a poly(aryl ether sulfone) which will crystallize from the melt.

Another object is to provide a melt crystallizable poly(aryl ether sulfones) having excellent chemical resistance and thermo-oxidative stability.

Another object is to provide a poly(aryl ether sulfone) having a high heat distortion temperature for use in high heat applications.

SUMMARY OF THE INVENTION

The poly(aryl ether sulfones) of the present invention are derived from a 1,4″-(bishalophenylsulfone)terphenyl, and a dihydric phenol. These polymers generally crystallize from the melt, exhibit high levels of chemical resistance and thermo-oxidative stability, and have a high heat distortion temperatures.

DETAILED DESCRIPTION OF THE INVENTION

The present invention involves a poly(aryl ether sulfones) derived from 1,4″-(bishalophenylsulfone)terphenyl and a dihydric phenol.

The monomer, 1-4″-(bishalophenylsulfonyl)terphenyl, is prepared from a reaction mixture of p-terphenyl and p-halobenzenesulfonyl halide using a metal halide catalyst. In general, the reaction appears as follows:

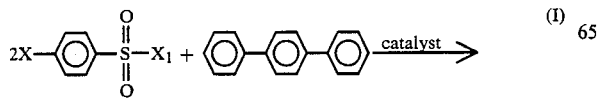

(I)

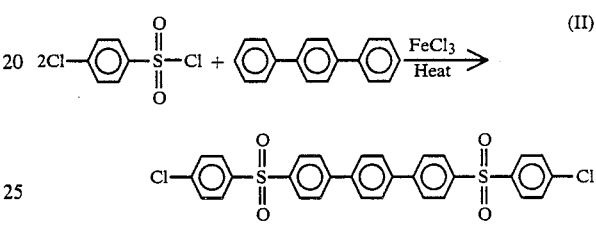

wherein X and $X_1$ are independently selected from halogens. Preferably, X is selected from chlorine, bromine and fluorine. Preferably, $X_1$ is selected from chlorine and bromine. More preferably, the monomer prepared is 1,4″-bis(p-chlorophenylsulfone)terphenyl and is derived from a reaction mixture of p-terphenyl and p-chlorobenzenesulfonyl chloride in the presence of an organic solvent and a metal chloride catalyst, preferably ferric chloride. The reaction may be represented as follows:

(II)

Preferably the reaction rate is promoted by heating the reaction mixture to a temperature selected from between 110° C. and 170° C. and more preferably between 150° C. and 170° C. for a period of at least about 0.5 hours to obtain a substantial yield of the monomer. The organic solvent of the reaction mixture is 1,2,4 trichlorobenzene although other organic solvents which are suitable for dissolving terphenyl and the p-halobenzenesulfonyl halide may also be employed. The amounts of p-halobenzenesulfonyl-halide and terphenyl employed in the reaction mixture should be in mole ratios of about 2:1 and preferably a slight excess of p-halobenzenesulfonyl halide should be present, for example, a mole ratio of 2.1 to 1. After the reaction mixture is heated and allowed to react to from the 1,4″-(bishalophenylsulfone)terphenyl monomer, the monomer can be isolated by filtration, washing and drying.

The polymer of the present invention may be prepared under anhydrous conditions in a dipolar aprotic solvent by reacting a dihydric phenol with the 1,4″-(bishalophenylsulfone)terphenyl monomer in the presence of a base. The reaction can be represented as follows:

HO—R—OH +  (III)

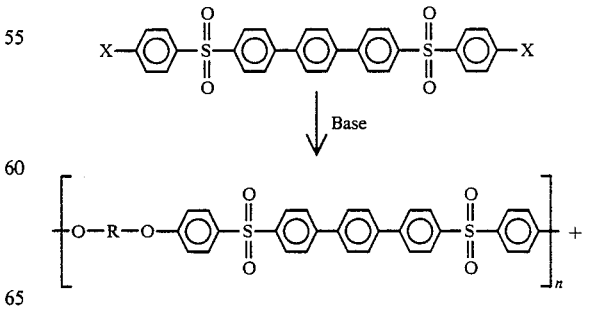

2HX: Base where R is a member of the class consisting of (i)

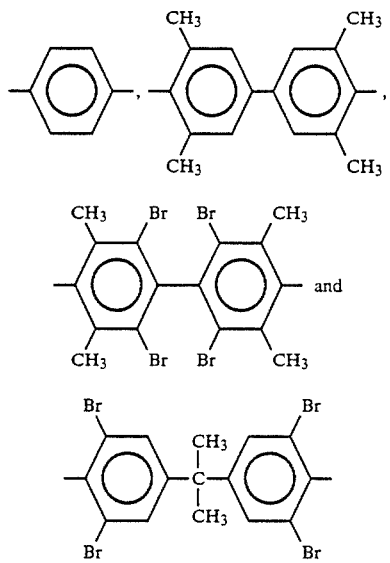

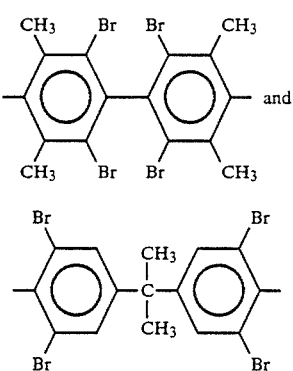

and (ii) divalent radicals of the general formula:

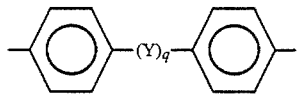 (V)

where Y is a member selected from the class consisting of divalent radicals of the formulas:

$$-C_zH_{2z}-, \quad -\overset{\overset{O}{\|}}{C}-, \quad -\overset{\overset{O}{\|}}{\underset{\underset{O}{\|}}{S}}-, \quad -O- \text{ and } -S- \quad \text{(VI)}$$

where q is 0 or 1, and z is a whole number from 1 to 5.

Suitable dihydric phenols include the dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)methane. Other dihydric phenols which are also suitable for use in the preparation of the above polymers are disclosed in U.S. Pat. Nos. 2,999,835; 3,038,365; 3,334,154; and 4,131,575; incorporated herein by reference.

The preferred dihydric phenols are bisphenol-A

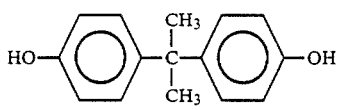 (VII)

and hydroquinone

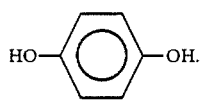 (VIII)

Thus, when bisphenol-A is the dihydric phenol, R is

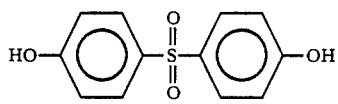 (IX)

and when hydroquinone is the dihydric phenol, R is

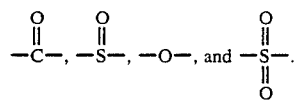 (X)

Preferably blends of dihydric phenols are not employed in that such blends generally reduce the tendencies of the polymer to crystallize from the melt.

Another preferred dihydric phenol is bisphenol sulfone, which can be represented by the formula:

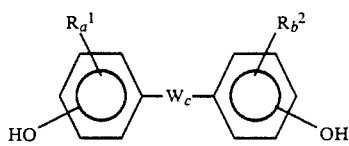 (XI)

Suitable dihydric phenols may also be:

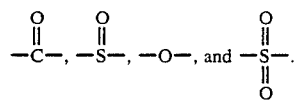 (XII)

wherein $R^1$ and $R^2$ are the same or different and are alkyl of one to four carbon atoms, inclusive, preferably one to three, and halogen, preferably chloro or bromo.

The letters a and b are the same or different and are an integer of 0, 1, 2, 3 or 4, preferably 0, 1 or 2.

W is selected from alkylene of two to ten carbon atoms, inclusive, alkylidene of one to ten carbon atoms, inclusive, cycloalkylene off four to twelve carbon atoms, inclusive, cycloalkylidene of four to twelve carbon atoms, inclusive, —S—, —S—S—, $$-\overset{\overset{O}{\|}}{C}-, \quad -\overset{\overset{O}{\|}}{S}-, \quad -O-, \text{ and } -\overset{\overset{O}{\|}}{\underset{\underset{O}{\|}}{S}}-.$$

c is 0 or 1.

The polymer may be produced by either a DMSO process or a DMAC process, similar suitable polymer forming processes are set forth in Johnson, et. al., U.S. Pat. No. 4,175,175, which is incorporated herein by reference. The DMSO process involves the addition of a stoichometric amount of a base, preferably a metal hydroxide, e.g. NaOH, at 2 mole equivalents to the dihydric phenol in a dipolar aprotic solvent to form an anhydrous disodium salt of the dihydric phenol. The 1,4"-(bishalophenylsulfone)terphenyl is then added to the solution containing the anhydrous disodium salt and heated to form the polymer. In more detail, the DMSO process involves preparing the poly(aryl ether sulfones) involves converting the dihydric phenol to the alkali metal salt by reaction of the alkali metal with the dihydric phenol in the dipolar aprotic solvent. A suitable dipolar aprotic solvent is dimethylsulfoxide, although other solvents may also be suitable. The solvent preferably also contains amounts of a cosolvent such as toluene or chlorobenzene which are used to azeotropically remove the water of reaction.

Another suitable process for the preparation of the poly(aryl ether sulfone) is the DMAC process which involves preparing a mixture of the 1,4″-(bishalophenylsulfone)terphenyl, dihydric phenol, an excess of a base (i.e. K₂CO₃ at greater than 2 mole equivalents thereof), a solvent comprising a dipolar aprotic solvent and a cosolvent to azeotropically remove the water of the reaction, heating the mixture and simultaneously removing water therefrom to form a reacted mixture comprising polymer and a metal halide salt. Suitable dipolar aprotic solvents include dimethylacetamide, although other dipolar aprotic solvents such as diphenyl sulfone are suitable. The cosolvent employed is toluene, although other cosolvents, for instance, benzene, heptane, xylene, toluene, chlorobenzene, dichlorobenzene, and the like, are suitable. The cosolvent may be present at levels as high as 50 weight percent of the combined solvent and cosolvent present.

It is desirable to exclude oxygen from the reaction mixture to avoid side reactions between diatomic oxygen and the reactants, solvents or polymers. A nitrogen atmosphere was employed to ensure the exclusion of diatomic oxygen from the presence of the reaction mixture.

The reaction temperature is preferably above 110° C. in order to keep the polymer in solution and for improved reaction rates, more preferably the reaction temperature is between 150° C. and 170° C. The reaction temperature should be below 190° C. if dimethylsulfoxide is employed in order to avoid thermal decomposition thereof.

Reaction temperatures may be above the normal boiling point of the solvents if pressures in excess of atmosphere pressure are employed. The amount of solvent employed may vary, preferably the reaction mixture comprises 50% to 85% by weight solvent.

Following polymer formation, the polymer may be recovered from the solvent by conventional separation processes such as precipitation of the polymer in a non solvent such as methanol followed by washing and drying of the polymer. Molecular weight of the polymer may be controlled by the addition of chain stoppers to the reaction mixture.

The polymers prepared from dihydric phenols and 1,4″-bis(p-chlorophenylsulfone)terphenyl were rapidly crystallized from the melt and exhibited high heat distortion temperatures.

Suitable polymers also include copolymers obtained by reacting 1,4″-bis(p-chlorophenylsulfone)terphenyl and a dichlorodiphenylsulfone compound with the dihydric phenol. The dichlorodiphenylsulfone compound may be 4,4′-dichlorodiphenylsulfone which can be represented by the formula:

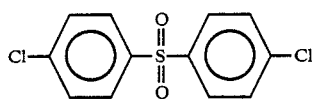

(XIII)

Preferably, the 1,4″-bis(p-chlorophenylsulfone)terphenyl is present at a level o at least 25 mole percent based on the total moles of 1,4″-bis(p-chlorophenylsulfone)terphenyl and dichlorodiphenyl compound employed.

EXAMPLES

The following examples are provided by way of illustration and not by way of limitation.

Example 1

The monomer, 1,4″-bis(p-chlorophenylsulfone)terphenyl was prepared as follows:

575.8 grams (2.5 moles) of p-terphenyl (M.W. 230.31) was added to 1500 milliliters of 1,2,4-trichlorobenzene to form a slurry, this slurry was then swept with N₂ for about 30 minutes. The slurry was then heated to 70° C. without the terphenyl completely dissolving. The slurry was then further heated to 110° C. without the p-terphenyl completely dissolving. 1108.13 grams (97%) of p-chlorobenzenesulfonylchloride (5.25 moles) (M.W. 211.07) was dissolved in 700 milliliters (ml) of 1,2,4-trichlorobenzene and added to the terphenyl slurry and thereby formed a homogenous solution. 55 grams of ferric chloride (FeCl₃, M.W. 162.2, 0.25 moles) was added to the solution to form a reaction mixture. The mixture was heated and maintained within a temperature range of 150° C. to 170° C. for 20 hours to obtain a reacted mixture. The monomer, 1,4″-bis(p-chlorophenylsulfone)terphenyl was then isolated from the reacted mixture by filtration of the reacted mixture, washing the resultant filtered solid with methanol, slurrying the washed solids with 3 liters of water and 60 grams of citric acid, heating and then filtering this slurry, washing these filtered solids with methanol and hot toluene, slurrying the solids in hot xylene and filtering off the xylene, slurrying the resultant solids in acetone followed by filtering off the solids therefrom. These solids were then dried at 100° C. under vacuum for 6 hours and then were further dried at 130° C. under vacuum for over 12 hours to yield 1160 grams of 1,4″-bis(p-chlorosulfone)terphenyl having a Tm by differential scanning calorimetry of 351° C., a heat of fusion of 25.5 cal/gm, and a molecular weight of 579.50 grams per mole.

Example 2

A poly(aryl ether sulfone) was prepared by reacting 1,4″-bis(p-chlorophenylsulfone)terphenyl and bisphenol-A. Bisphenol-A, K₂CO₃, diphenylsulfone, toluene and 1,4″-bis(p-chlorophenylsulfonyl)terphenyl were admixed to form a reaction mixture. The reaction mixture was heated to a reaction temperature of 170° C. with simultaneous removal of water from the mixture to form polymer in a reacted mixture. The reacted mixture was poured into methanol and then filtered. The filtered solids were then added to hot H₂O to form a slurry, filtered, added to H₂O, filtered, added to acetone, filtered, added to acetone, filtered, added to hot H₂O, filtered, and then dried by vacuum in a vacuum oven at 175° C. The resultant polymer and an intrinsic viscosity of 0.52 dl/g as determined in phenol/1,1,2,2 tetrachloroethane (TCE) and had a Tm of 338° C. as determined by differential scanning calorimetry. The polymer was rapidly crystallizable from the melt.

Example 3

A poly(aryl ether sulfone) was prepared by reacting 1,4″-bis(p-chlorophenylsulfone)terphenyl with hydroquinone. Under a nitrogen atmosphere 15.9 grams of 1,4″-bis(p-chlorophenylsulfone)terphenyl (0.20 moles, M.W. 579.50), 22.02 grams of hydroquinone (0.20 moles, M.W. 110.10), 45 grams of $K_2CO_3$ (M.W. 138.21), 350 grams of diphenylsulfone and 100 ml of toluene were mixed together and were heated while water was simultaneously being removed by distillation to form polymer in a reacted mixture. The reacted mixture was removed from the flask, poured into methanol. The solids were then filtered out, slurried in hot $H_2O$, filtered out, slurried in hot $H_2O$, filtered out, slurried in acetone, filtered out, slurried in acetone, filtered out, slurried in hot $H_2O$, filtered, dried in a vacuum over at 175° C. The resultant polymer was insoluble in a phenol/TCE solvent and had a melting temperature of 411° C. The polymer was rapidly crystallized from the melt.

Example 4

A poly(aryl ether sulfone) was prepared by reacting 1,4''-bis(p-chlorophenylsulfone)terphenyl with bisphenol sulfone. 6.1818 grams (0.0100 moles) of 1,4''-bis(p-chlorophenylsulfone)terphenyl and 2.5033 grams (0.0100 moles) of bisphenol sulfone were mixed together with 2.0040 grams of $K_2(CO_3)$ 30.0034 g of diphenyl sulfone and 3 milliliters of toluene. The reactants were placed in a 100 ml reaction flask and brought to a temperature of 160° C. with a $N_2$ blanket, another 3 milliliters of toluene was added, the reaction was run for over 12 hours, the reaction temperature was then raised to 260° C. and run for 1 hours and then allowed to cool for over 12 hours. The reactants were then heated to 260° C. again for 4 hours. The resulting polymer was then cooled and washed with methanol, then hot water, then hot water, then acetone, then acetone, and then hot water. The polymer was in the form of a fine powder and was then refluxed in acetone. The resultant polymer had an intrinsic viscosity of 0.12 dl/g in phenol/tetrachloroethane, a glass transition temperature of 196° C. via a differential scanning calorimeter, and a melting temperature of 240° C. via a differential scanning calorimeter.

Example 5

A poly(aryl ether sulfone) was prepared by reacting 1,4''-bis(p-chlorophenylsulfone)terphenyl with 4,4'-dichlorodiphenyl sulfone, represented by the formula:

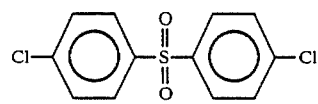

and 4,4'-dihydroxydiphenyl ether, represented by the formula:

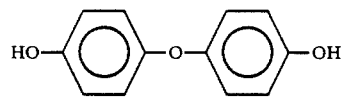

4.6706 grams of 1,4''-bis(p-chlorophenylsulfone), 0.7180 grams of 4,4'-dichlorodiphenylsulfone and 2.0008 grams of 4,4'-dihydroxydiphenyl ether were mixed with 2.0008 grams of $K_2CO_3$, 30.0001 grams of diphenylsulfone and 4 milliliters of toluene. The reactants were heated to 160° C. under a nitrogen blanket. The reactants were then heated to 200° C. and then to 260° C. for one hour total and then allowed the reactants to cool, then heated the reactants to 160° C. for 6 hours, then 200° C. for 0.5 hours, then 260° C. for 1 hour and 40 minutes. The resultant polymer was then washed with methanol, then hot water, then hot water, then acetone, then acetone and then hot water. The polymer was then refluxed in acetone for 3 days. The resulting polymer had an intrinsic viscosity of 0.54 dl/g as measured in phenol and TCE (tetrachloroethane), a melting temperature of 245° C. as measured by a differential scanning calorimeter, and glass transition temperature of 226° C. as measured by a differential scanning calorimeter.

Example 6

A poly(aryl ether sulfone) was prepared by reacting 1,4''-bis-(p-chlorophenylsulfone)terphenyl with bisphenol of acetophenone (1-phenyl-1,1-bis(4-hydroxyphenyl))ethane which can be represented by the formula

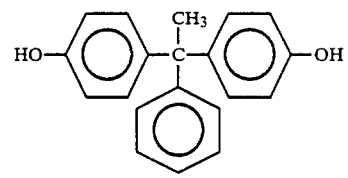

6.1818 grams of 1,4''-bis-(p-chlorophenylsulfone)terphenyl and 2.9042 grams of bisphenol of acetophenone were mixed with 2.0115 grams of $K_2CO_3$, 29.9942 grams of diphenylsulfone and 4 milliliters of toluene. The reactants were heated to 160° C. under a nitrogen blanket, increased temperature to 170° C. for about 7 hours, increased temperature to 200° C. for one hour, then to 22020 C. for 20 minutes then to 260° C. for 2 hours and 20 minutes. The resulting polymer washed with methanol, then hot water, then hot water, then acetone and then hot water. The polymer was then refluxed in acetone over 48 hours. The polymer had an intrinsic viscosity of 0.11 dl/g in phenol/TCE and had a melting temperature of 229° C. as measured by differential scanning calorimetry.

EXAMPLE 7

Poly(aryl ether sulfone) from the reaction products of 1,4''-bis(p-chlorophenylsulfone)terphenyl and dihydroxy diphenyl ether which represented by the formula:

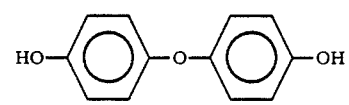

6.1196 grams of 1,4''-bis(p-chlorophenylsulfone)terphenyl and 2.0001 grams of dihydroxy diphenyl ether were mixed with 2.0010 grams of $K_2CO_3$, 30.0225 grams of diphenyl sulfone and 10 milliliters of toluene. The reactants were heated under a nitrogen blanket. The reactants were eventually heated to 280° C. to complete the reaction. The resultant polymer was refluxed in N N dimethyl acetamide and then washed with methanol, hot water, hot water, acetone, acetone and then hot water. The resultant polymer was then dried and exhibited an intrinsic viscosity of 0.41 dl.g in phenol and tetrachloroethane, a melting temperature of 275° C. via differential scanning calorimetry and a glass transition temperature of 225° C. via differential scanning calorimetry.

What is claimed:

1. A polymeric resin comprising polymeric chains having repeating units of the formula:

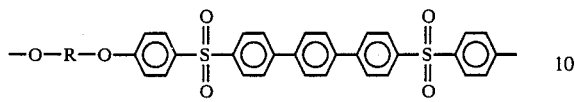

wherein R is selected from the group consisting of divalent members having the formulas:

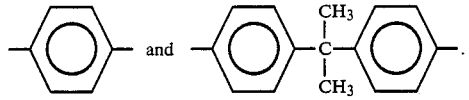

2. A polymeric resin derived from (i) a dihydric phenol and (ii) a monomer represented by the formula:

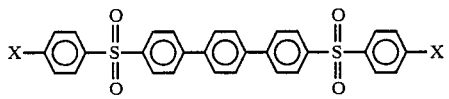

wherein X is independently selected from the group consisting of halogens.

3. A polymeric resin comprising polymeric chains having repeating units of the formula:

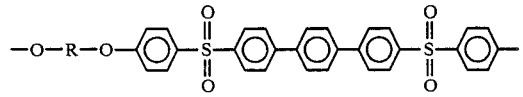

wherein R is selected from the group consisting of
(i)

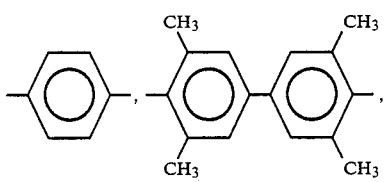

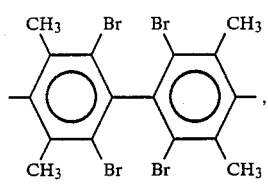

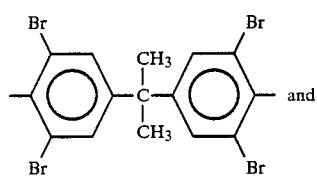

(ii) divalent radicals of the general formula:

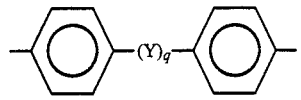

wherein Y is a member selected from the class consisting of divalent radicals of the formula:

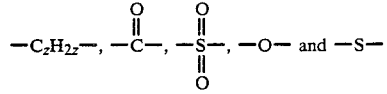

where q is 0 or 1, z is a whole number from 1 to 5.

4. A poly(aryl ether sulfone) reaction product of:
(a) 1,4''-(bishalophenylsulfone)terphenyl; and
(b) a dihydric phenol.

5. A poly(aryl ether sulfone) reaction product of:
(a) 1,4''-(bischlorophenylsulfone)terphenyl; and
(b) bisphenol A.

6. A poly(aryl ether sulfone) reaction product of:
(a) 1,4''-(bischlorophenylsulfone)terphenyl; and
(b) bisphenol sulfone.

7. A poly(aryl ether sulfone) reaction product of:
(a) 1,4'''-bis(p-chlorophenylsulfone)terphenyl;
(b) 4,4'-dichloridiphenylsulfone; and
(c) 4,4'dihydroxydiphenylether.

8. A poly(arylethersulfone) reaction product of:
(a) 1,4-bis(p-chlorophenylsulfone)terphenyl; and
(b) 1-phenyl-1,1-bis(4-hydroxyphenyl)ethane.

9. A poly(arylethersulfone) reaction product of:
(a) 1,4''-bis(p-chlorophenylsulfone)terphenyl; and
(b) dihydroxy phenyl ether.

10. A polymeric resin derived from:
(i) a dihydric phenol represented by the formula:

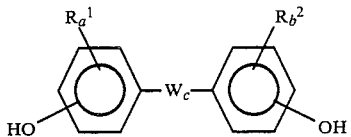

wherein $R^1$ and $R^2$ are independently selected from alkyl radicals having from one to four carbon atoms and halogen radicals; a and b are independently selected from 0, 1, 2, 3 and 4; W is selected from alkylenes of two to ten carbon atoms, alkylidenes of one to ten carbon atoms, cycloalkylenes of four to twelve carbon atoms, inclusive, —S—, —S—S—,

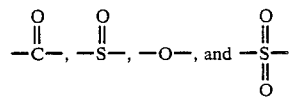

and c is selected from 0 and 1; and
(ii) a monomer represented by the formula:

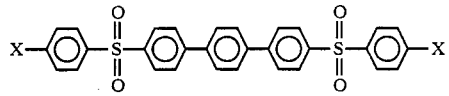

wherein each X is independently selected from the class consisting of halogens.

11. The poly(aryl ether sulfone) of claim 4 wherein said 1,4''-(bishalophenylsulfone)terphenyl is 1,4''(bischlorophenylsulfone)terphenyl.

12. The poly(aryl ether sulfone) of claim 10 wherein said 1,4''-(bishalophenylsulfone)terphenyl is 1,4''(bischlorophenylsulfone)terphenyl.

* * * * *